United States Patent

Martin et al.

[15] 3,699,448

[45] Oct. 17, 1972

[54] PRECISION GENERATION OF LINEAR F. M. SIGNAL

[72] Inventors: Gregory L. Martin, 4607 No. 53 Drive, Phoenix, Ariz. 85031; Lloyd R. Blair, 1130 West Myrtle, Phoenix, Ariz. 85021

[22] Filed: Feb. 8, 1971

[21] Appl. No.: 113,420

[52] U.S. Cl. ....................325/131, 325/148, 331/178

[51] Int. Cl. .............................................H03b 23/00

[58] Field of Search......325/131, 145, 148, 159, 184; 331/14, 17, 178, 179; 332/18, 19

[56] References Cited

UNITED STATES PATENTS

| | | | |
|---|---|---|---|
| 3,382,460 | 5/1968 | Blitz et al. | 331/178 |
| 3,611,147 | 10/1971 | Rittenbach | 325/159 |
| 3,297,964 | 1/1967 | Hamilton | 325/148 X |
| 3,458,834 | 7/1969 | Brounley et al. | 325/148 X |
| 3,421,112 | 1/1969 | Mortley et al. | 331/178 |

*Primary Examiner*—Benedict V. Safourek
*Attorney*—J. G. Pere and L. A. Germain

[57] ABSTRACT

The invention achieves a linear waveform that is swept in frequency with great precision by means of a servo control that uses an error signal derived from the measurement of the actual phase of the swept frequency waveform at equal time intervals. These time intervals are chosen so the phase should be multiples of $2\pi$ at the sample times. These phase values coincide with zero crossings of the signal. If the signal amplitude is not zero, the sense of the phase errors is detected, and then sweep linearity corrections are applied in a closed loop feedback.

5 Claims, 3 Drawing Figures

INVENTORS
LLOYD R. BLAIR
GREGORY L. MARTIN
BY
Oldham & Oldham
ATTORNEYS

INVENTORS
LLOYD R. BLAIR
GREGORY L. MARTIN
BY
Oldham & Oldham
ATTORNEYS

PRECISION GENERATION OF LINEAR F. M. SIGNAL

Heretofore it has been known that precision linear F.M. signals can have great use in many and various electronic circuitry. What we mean by a linear F.M. signal is one which possesses a linear change in frequency as a function of time. For example, the resolution of a simple pulsed radar can be greatly enhanced with a chirped pulse having a change in frequency sufficient for the desired resolution and at the same time enough pulse width of constant amplitude for high average power to obtain the desired system signal-to-noise ratio. As the resolution of these systems improves, a demand for even greater linearity of the frequency-swept signals is needed.

Hence, it is the general object of the invention to effect generation of a linear F.M. signal with extremely small phase errors.

A further object of the invention is to provide an apparatus for generating a linear F.M. signal incorporating closed-loop error detection and correction feedback to minimize errors. This general technique is achieved by sampling the F.M. waveform at prescribed times thereby forming an error signal which is used to correct the waveform through the closed loop feedback.

For a better understanding of the invention reference should be had to the drawings wherein.

Figure 1:
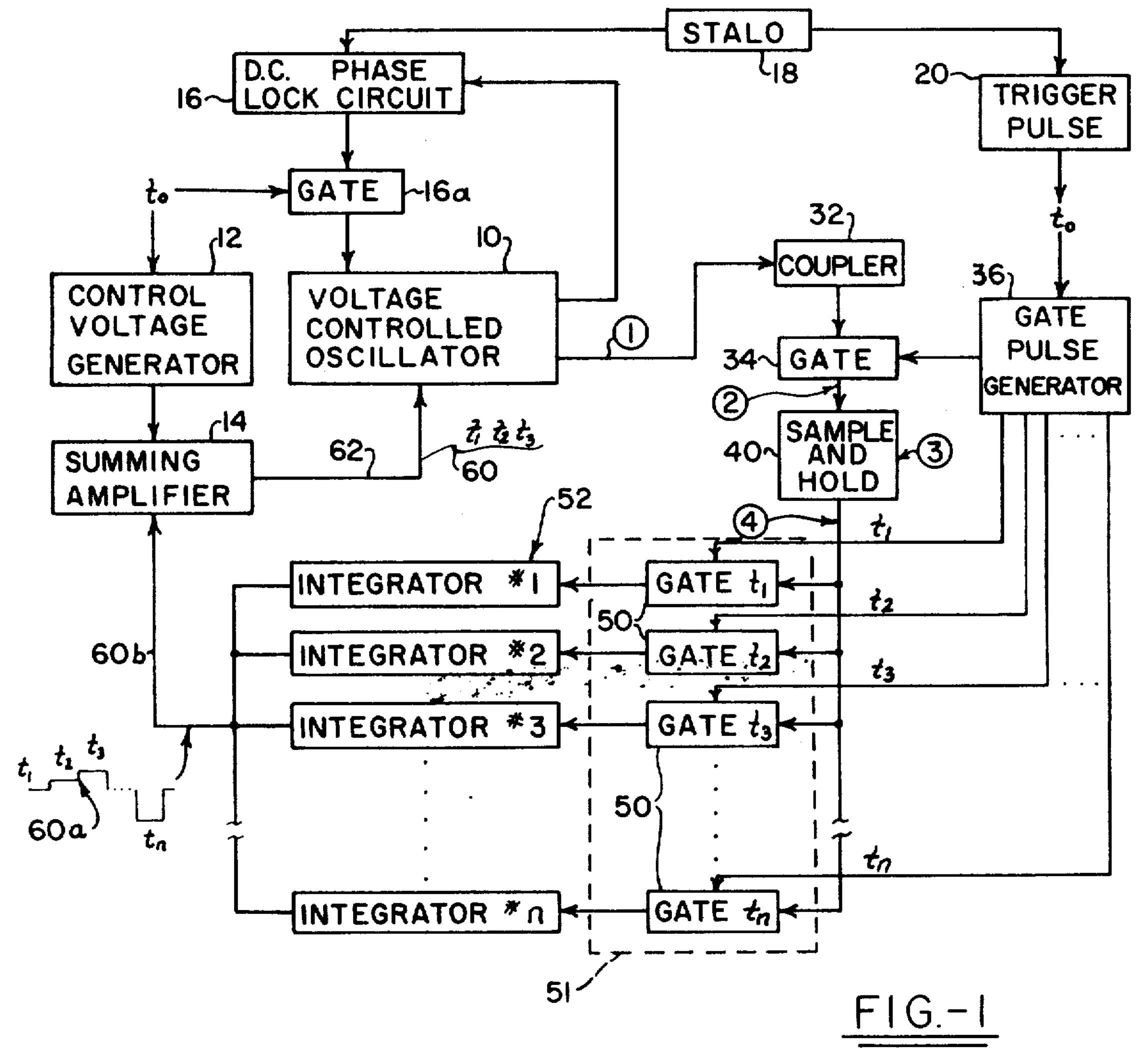
FIG. 1 is a block diagram of a basic closed loop correction system.

The basic device used for active generation of a linear F.M. pulse is a voltage controlled oscillator, indicated generally by numeral 10 in the block diagram of FIG. 1.

This type of oscillator is well known to those skilled in the art. Typical voltage controlled oscillators are backward wave oscillators, voltage controlled magnetrons, reactance type oscillators, and varactor controlled solid state oscillators. The control voltage as supplied from appropriate control voltage generator 12 through a summing amplifier is indicated by block 14 and will be defined more completely hereinafter.

For use in high resolution radar systems or where precision is extremely important, sweep rate accuracy of better than 0.1 percent is often required. At the present time, the devices available do not have this degree of linearity and accuracy especially when subjected to environmental changes. It is not feasible to compensate for these non-linearities passively, by shaping the voltage ramp, for example, because the characteristics of the non-linearities change with temperature and age. Furthermore, not only must the deviations in the voltage controlled oscillator 10 be considered, but also the deviations in the control voltage generator 12 and the other portions of the system.

A truly linear F.M. signal possesses a property that provides an accurate method of detecting phase errors. Having detected the errors, it is then possible to incorporate feedback into the system to remove the errors. This property can be seen in the following analysis. The instantaneous frequency of a linear pulse can be written $$f(t) = f_0 + kt, \qquad (1)$$

where $f_0$ is an initial frequency at $t=0$ and $k$ is the F.M. rate or rate of change of frequency with time.

The instantaneous phase is found by integrating $f(t)$ to yield $$\phi(t) = 2\pi\,[f_0 t + (kt^2/2) + \epsilon] \qquad (2)$$

where $\epsilon$ is an arbitrary constant.

The number of cycles $N_1$, during interval of time between $t_1$ and $t_1+\tau$ where $\tau$ is a constant, is $$N_1 = (1/2\pi)\,[\phi(t_1+\tau) - \phi(t_1),] \qquad (3)$$

$$N_1 = f_0\tau + kt_1\tau + (k\tau/2) \qquad (4)$$

and the number of cycles is the integral between $t_1+\tau$ and $t_1+2\tau$ is $$N_2 = (1/2\pi)\,[\phi(t_1+2\tau) - \phi(t_1+\tau)] \qquad (5)$$

$$N_2 = f_0\tau + (k/2)\,(2t_1\tau + 3\tau^2) \qquad (6)$$

Because $f(t)$ is increasing in frequency with time, the number of cycles during the second interval is greater than the number during the first interval. This increase, $n$ is $$n = N_2 - N_1 = k\tau^2 . \qquad (7)$$

The constants $k$ and $\tau$ can be choosen in such a manner so as to make $n$ an integer. Since $n$ is not a function of $t_1$, the number of additional cycles between any two contiguous integrals of duration $\tau$ is constant provided that $\tau$ and $k$ remain constant. Solving for the sampling interval $\tau$ $$\tau = \sqrt{n/k} \qquad (8)$$

Figure 2:
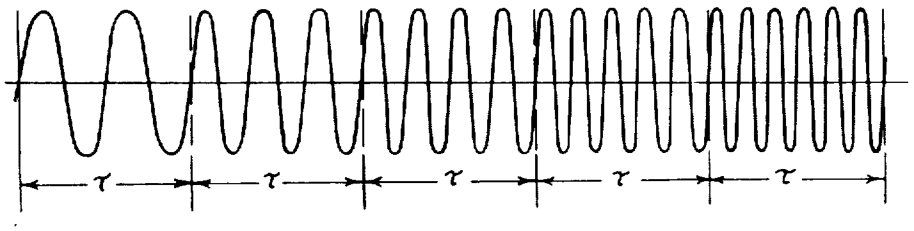
FIG. 2 is a graphic illustration of a linear signal waveform.

Therefore, if a perfectly linear F.M. pulse of a particular starting phase were sampled at the interval $\tau$, the sample value can be zero at each sample point. This is shown in FIG. 2. In effect, it can be seen that the number of cycles difference between any two contiguous intervals of the predetermined duration is one.

A small portion of the output signal from the oscillator 10 is coupled into a phase lock circuit 16. The circuit 16 is familiar to those skilled in the art, and is of the type used in coherent radar systems, for example. The signal from oscillator 10 is compared with the reference frequency from a stalo 18. Frequency and phase errors are detected by circuit 16 and applied as feedback to the oscillator 10 to force the phase difference between the oscillator 10 and the stalo 18 to approach a constant 90°. When this condition is achieved, and this is a typical condition well known to those skilled in the art, the oscillator 10 is said to be phased locked to the stalo 18.

It is important to the operation of the invention, however, that the oscillator be phase locked to the reference stalo immediately prior to the initiation of the sweep pulse. The sweep is coordinated by the stalo 18 with a trigger pulse 20 producing the initiation pulse $t_0$. Preferably, the trigger pulse 20 is initiated by some typical type of external control either manually or automatically.

At the time pulse $t_0$ begins, phase lock is broken by gating out the phase lock circuit 16 by means of gate 16a and sweeping the oscillator 10 by the initiation pulse $t_0$ supplied to the generator 12. At the end of the sweep pulse, the phase lock circuit 16 is again gated into the loop to re-phase-lock the oscillator to the stalo 18.

The output of the oscillator 10 may be amplified to increase its level, but this is not illustrated. The output signal, however, is illustrated by the circled number 1 which is shown in graph 30 in FIG. 3. The signal 1 enters a coupler 32 which simply couples it to the remainder of the circuitry and particularly directs the signal into a gate 34. The gate 34 is controlled by a gate pulse generator 36 again initiated by $t_0$ which generates a train of pulses $t1, t2, t3, \ldots tn$ at the proper timing interval as determined by the desired linear sweep characteristics of oscillator 10. These pulses through gate 34 cause the oscillator output to be sampled at the predetermined times as dictated by the desired linear sweep characteristics of oscillator 10. A typical width of the pulses t1, etc. is 1 microseconds, and the typical number of samples pulses will be about 10 in the generation of the linear F.M. signal for use in radar, as a typical use. As a guideline, the optimum width of the sample is of the order of one-half of the period of the highest frequency being sampled.

Figure 3:
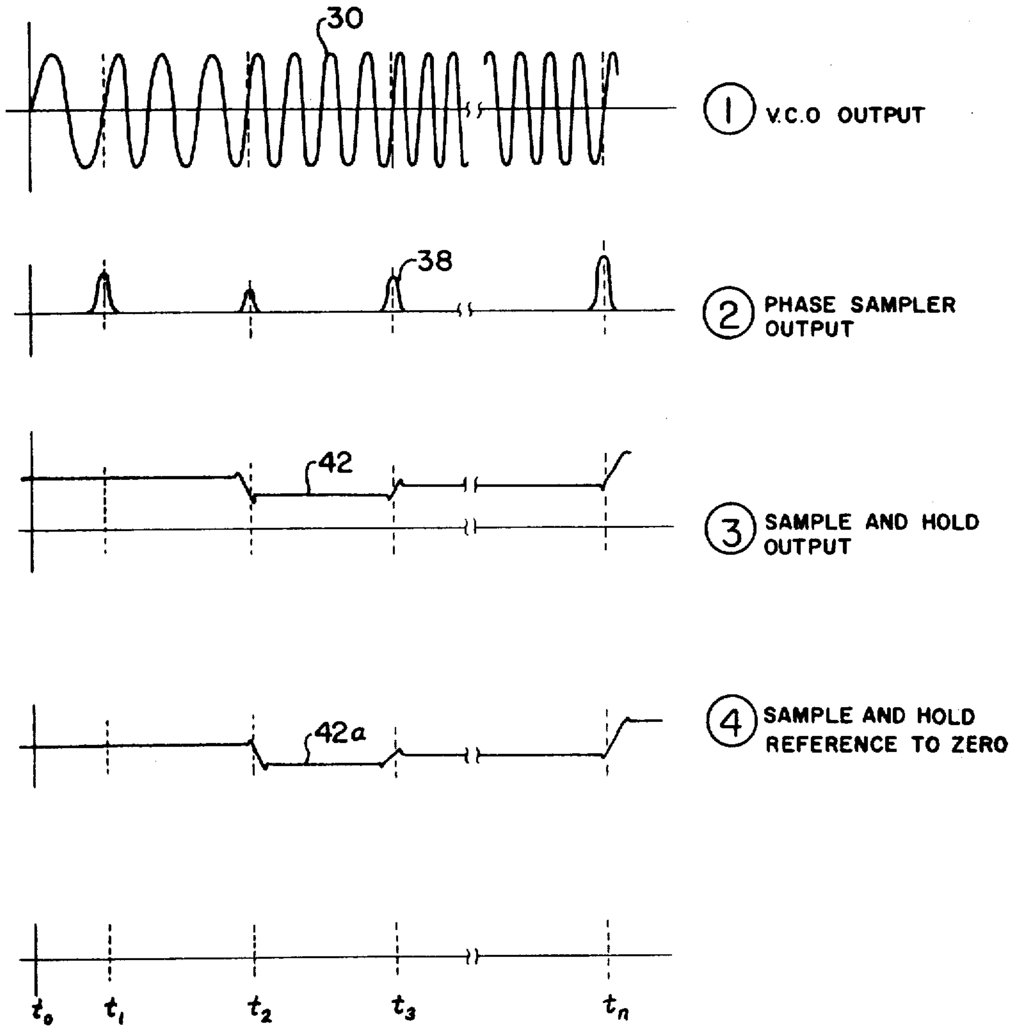
FIG. 3 is a graphic illustration of the correction signal generated by the block diagram of FIG. 1.

The output signals from gate 34 then appear as pulses illustrated by graph 38 in FIG. 3 and identified by the circled numeral 2. The signals pass into a sample and hold circuit 40 which is essentially A.C. coupled into the system. As a result only relative differences between these levels are detected which is exemplified by graph 42 identified by the circled numeral 3 in FIG. 3. The sample and hold circuit 40 is conventional and well understood by those skilled in the art.

The sample and hold circuit 40 detects the peak amplitude of the pulses generated through gate 34 and holds this level during the equal time intervals between samples as shown in Graph 42 of FIG. 3. The arbitrary offset voltage illustrated in graph 42 may also be removed within the sample and hold circuit 40 by referencing the zero phase samples taken prior to zero. This is shown by the graph **42*a* of FIG. 3, and is represented by the circled numberal 4 in FIG. 1. As a result, positive and negative phase errors appear as positive and negative voltages respectively at the output of the sample and hold circuit 40. The gate pulse generator 36 synchronizes the sample and hold circuit 40 with respect to gate 34**.

The output pulse indicated by circled numeral 4 is then appropriately applied through gates indicated generally by numeral 50 which couple to appropriate integrators 52 so that each sample is applied to a separate gated integrator. This may be appropriately accomplished by an electronic commutator indicated generally by block 51 in FIG. 1, as is well understood by those skilled in the art. For example, in FIG. 1, the input gate $t_1$ for integrator number 1 conducts during the intergal from $t0$ to $t1$. All other input gates are open circuits. At times $t1$, input gate $t1$ disconnects and gate $t2$ conducts. All the others remain unchanged. As a result, integrator number 1 stores only the phase errors detected during the time interval from $t0$ to $t1$, and so on for each phase sample taken during the sweep.

Preferably, each integrator has a shorting switch across the integrator capacitor. While the shorting switch is closed, the integrator is held inoperative. When the shorting switch is opened, the integrator begins to integrate the input voltage. This technique is well understood by those skilled in the art, and is easily accomplished by coordinating the switch with the appropriate gate 50. If a phase error in the output of oscillator 10 is detected over a number of sweeps, the integrator associated with that particular sample accumulates a voltage on the integrator capacitor. The output of each integrator is gated into a summing amplifier 14 which combines the outputs of all the integrators to form a phase error correction signal which appears as the signal 60 sent over line 62 to the oscillator 10. Actually, the signal 60 representing the summation of the integrators is illustrated by numeral **60*a* over line 60*b* to the summing amplifier 14 so as to modify the voltage ramp in sweep generator 12 and thereby in a closed loop correction the phase errors in the output of oscillator 10**.

The time at which the output of each integrator 52 is read out by the appropriate gate 50 associated therewith is very important. The ideal time is before the sample time of integrator input, yet not so much earlier that it effects the sample input of the preceeding integrator. For example, the output of integrator number 2 would be gated into the summing amplifier at time $t_1$, and since the phase does not change instantaneously, the input sample of integrator number 1 is not affected. The oscillator 10 has an interval of $\tau$ seconds to modify the instantaneous output frequency so that the signal sample by integrator number 2 is forced to 0. Integrator number 1 is connected at time $t_1$, and integrator number n is connected at time $t_n + (n-1)\tau$.

It is an important feature of the invention that all of the integrators cannot be released simultaneously during initial lock on because the instantaneous phase error at some of the latter sample times may greatly exceed 180° because the frequency is increasing so rapidly as shown in the graph 30 of FIG. 3. It should be understood that 180° is the maximum phase error that may exist at a sample time without causing the system to lock-in on an ambiguous zero crossing. This problem is eliminated by sequentially releasing each integrator, and in effect is accomplished by the separate signals from generator 36 properly timed and coordinated by $t_0$ to apply the integrator sequentially at times $t_1, t_2, t_3, \ldots t_n$. For example as the sweep is linearized, integrator number 1 is released first. After it has had sufficient time to correct the phase at time $t_1$, then integrator number 2 is released. After integrator number 2 has had sufficient time to stabilize, integrator number 3 is released and so on until phase error at each sample time is corrected. This timing control is carried by the gate pulse generator 36, and is quite well known to those skilled in the art. If a transient upsets the system so as to cause one or more of the integrators to run away, a level detector such as a bias diode or threshold detector in the summing amplifier 14 senses this condition and shorts all the integrator capacitors. It then releases them sequentially again to linearize the sweep pulse.

Hence, it is seen the objects of the invention are achieved by providing a closed loop feedback to a voltage controlled oscillator with integration of detected errors providing a correction signal to the control voltage generator driving the oscillator. The system works on the fact that pulse samples are taken at predetermined equally spaced time intervals based on where the zero crossing point of a truly linear F.M. waveform would fall, and detecting the phase differences at the sample points with respect to the true zero desired to provide the feedback signal.

While in accordance with the Patent Statutes, only a preferred embodiment of the invention is illustrated and described in detail, but it is to be understood that the invention is not limited thereto or thereby, but that the inventive scope is defined in the appended claims.

What is claimed is:

1. Apparatus to generate and control the linearity of a linear F.M. sweep pulse signal comprising:

a. a voltage controlled oscillator driven by a control voltage generator, the voltage controlled oscillator being phase locked, between sweep pulse signals, to a reference frequency oscillator by means of a phase lock circuit.

b. a gate pulse generator providing a train of pulses, the timing of which is determined by the desired sweep characteristics of the F.M. sweep pulse signal, which controls the gating of sample signals from the voltage controlled oscillator;

c. a first circuit means for detecting and holding the peak amplitude of the sample signals form the voltage controlled oscillator so as to create sample levels;

d. a plurality of gates which, under the control of the gate pulse generator, channel the sample levels of the first circuit means to the respective integrators associated with each gate; and e. a summing amplifier which combines the outputs of the integrators with the output of the control voltage generator so as to modify the input to the voltage controlled oscillator.

2. The apparatus according to claim 1 wherein the plurality of gates which, under the control of the gate pulse generator, channels the sample levels of the first circuit means to the respective integrators associated with each gate comprises an electronic commutator.

3. The apparatus according to claim 1 wherein a reference frequency oscillator comprises a STALO and wherein a trigger pulse means coordinated with the STALO and the gate pulse generator is provided to insure time coordination between the initiation of the F.M. sweep pulse signal from the voltage controlled oscillator and the gating of the gate pulse generator.

4. Apparatus according to claim 1 which includes means to short out all the integrators if any one integrator exceeds a predetermined level and to initiate the sampling of the output of the voltage controlled oscillator again by proper coordination with the gate pulse generator.

5. The apparatus according to claim 1 wherein the gate pulse generator generates a gate width of the order of one half of the period of the highest frequency being sampled thereby.

* * * * *